Figure 1:
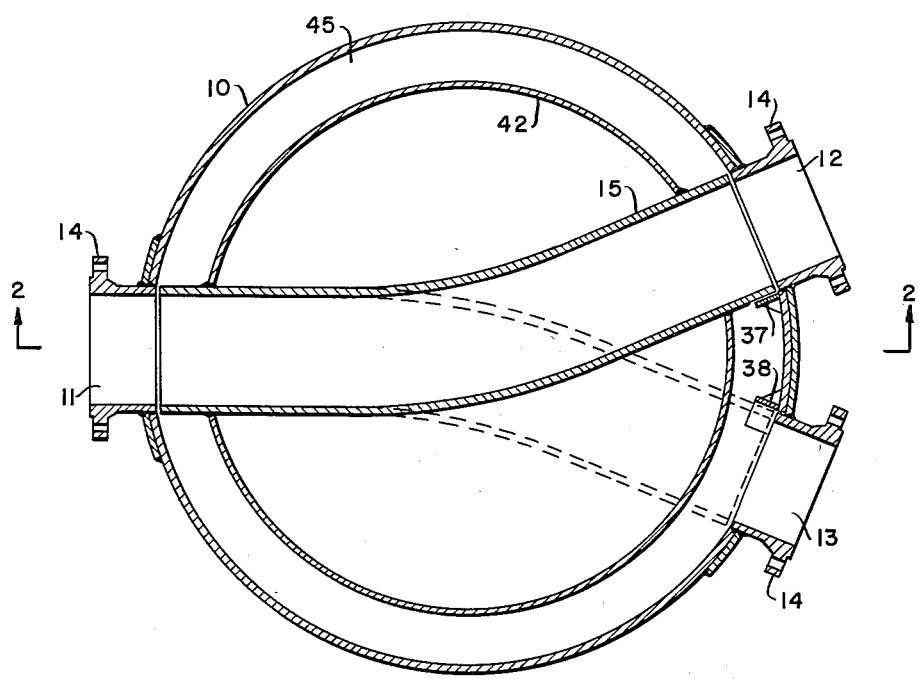

July 31, 1962  M. L. BARRETT, JR  3,047,020
PIPE LINE SCRAPER DIVERTER
Filed Jan. 6, 1959  3 Sheets-Sheet 1

FIG. I

INVENTOR:
M. L. BARRETT, JR.
BY: J. H. McCarthy
HIS AGENT

INVENTOR:
M. L. BARRETT, JR.
BY: J. H. McCarthy
HIS AGENT

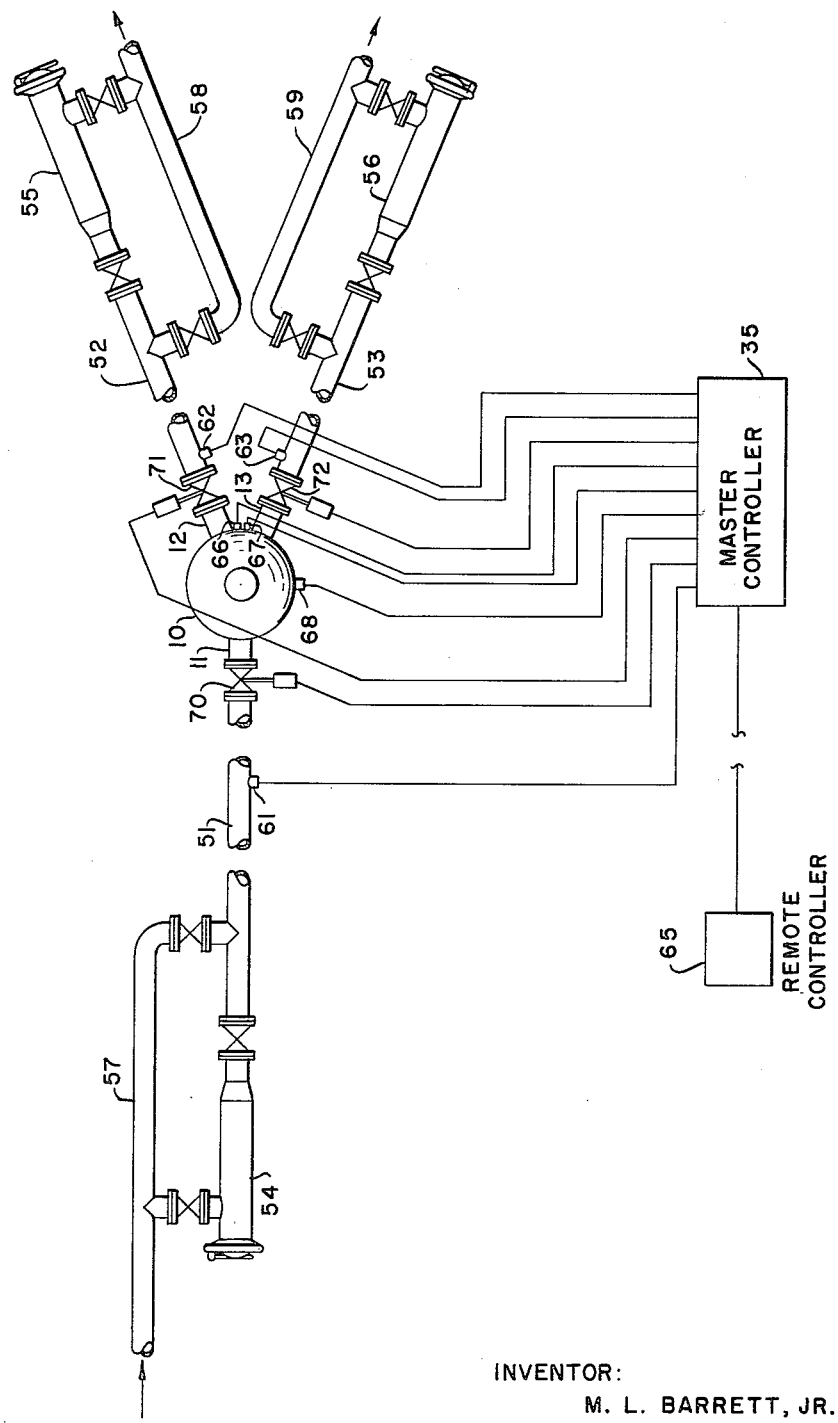

United States Patent Office 3,047,020
Patented July 31, 1962

3,047,020
PIPE LINE SCRAPER DIVERTER
Maurice L. Barrett, Jr., Zionsville, Ind., assignor to Shell
Oil Company, a corporation of Delaware
Filed Jan. 6, 1959, Ser. No. 785,277
3 Claims. (Cl. 137—625.46)

This invention relates to pipe line systems and pertains more to an apparatus for selectively switching or diverting pipe line scrapers, spheroids, plugs, and/or other such devices, commonly used in conjunction with the transportation of fluid products by a pipe line, from a main carrier pipe line to any one of a number of branch carrier pipe lines.

In the pipe line industry, devices known as scrapers, plugs, pigs, balls, spheroids, cleaners, etc., are propelled through a pipe line to scrape deposits from the inner wall thereof, and/or to reduce the interfacial volumes of mixture between two dissimilar fluids, and/or to accompany and identify an interface between two dissimilar fluids. Some means of launching these scrapers, plugs, etc., exists at the source of the principal carrier pipe line and means for receiving them and removing them from the pipe line is also provided at the terminus of all branch carrier pipe lines which may extend therefrom.

The present system of manipulating scrapers at a junction point in a main pipe line is primarily a manual operation which involves considerable piping, valves, scraper-receiving and scraper-launching barrels. The operation essentially consists of receiving the scraper or scrapers from the main pipe line in a barrel-type container, bypassing the fluid around such scraper-receiver and isolating it from the main carrier pipe line so that manual removal of the scraper may be carried out. Another scraper is then manually launched into the desired branched-carrier pipe line in a similar manner by placing the scraper in a barrel-type container and allowing the carrier fluid to propel the scraper into the fluid stream of the desired branch line. It is usually desirable to conduct such redirection of scrapers from a main line into branch lines without disrupting or interrupting the flow of fluids through the main carrier line.

It is therefore a primary object of this invention to provide an apparatus of simple design for diverting pipe line scrapers, spheroids, plugs, and other devices, preferably used in conjunction with the pipe line transportation of fluid products, from a main carrier pipe line into a selected one of a multiplicity of branching carrier pipe lines.

A further object of this invention is to provide a switching apparatus which diverts pipe line scrapers, spheroids, plugs and other propelled devices, used in conjunction with pipe line transportation of fluid products, from a main carrier pipe line into a selected one of a multiplicity of branching pipe lines, such apparatus being capable of manual operation at the site of the pipe line junction point or completely automatic and arranged for unattended operation by means of electrical signals originating at a point remote from the site with suitable controller means at the site.

Still another object of this invention is to provide an inexpensive scraper switching and diverter means which does not employ pipe line scraper receiving and launching barrels along with a multitude of piping and valves.

A still further object of this invention is to provide a completely safe pipe line scraper diverter installation, particularly where liquid hydrocarbons are involved, free from spillage, leakage and drainage of the transported fluid or fluids from any portion of the diverter.

Still another object of this invention is to provide a control system for a pipe line scraper diverter where an external signal device indicates the arrival of a scraper from a main carrier pipe line and the signal is employed to divert the scraper to the desired branch pipe line.

Still another object of this invention is to provide a pipe line scraper diverter which eliminates the necessity of personnel in attendance at the junction point of a pipe line during scraper movements.

It is also an object of the present invention to provide a pipe line scraper diverter which may receive a single stream from a main pipe line and simultaneously deliver two discharge streams to independent branch pipe lines when no scrapers are passing the junction point where the scraper diverter is located.

A further object of this invention is to provide a switching apparatus which diverts pipe line scrapers, spheroids, plugs, and other devices, used in conjunction with the transportation of fluids by pipe line, from a carrier pipe line to any one of the multiplicity of carrier pipe lines without undue agitation of the fluid and/or without materially increasing the amount of interfacial mixture between various fluid products as they flow through the device.

Still another object of this invention is to provide a switching apparatus which affords the smooth and uninterrupted passage of a scraper and its accompanying fluid from the main carrier line, through the diverter and into the selected branch line without the necessity of removing the scraper from the main pipe line and inserting the same or a similar scraper in the desired branch line.

Figure 2:
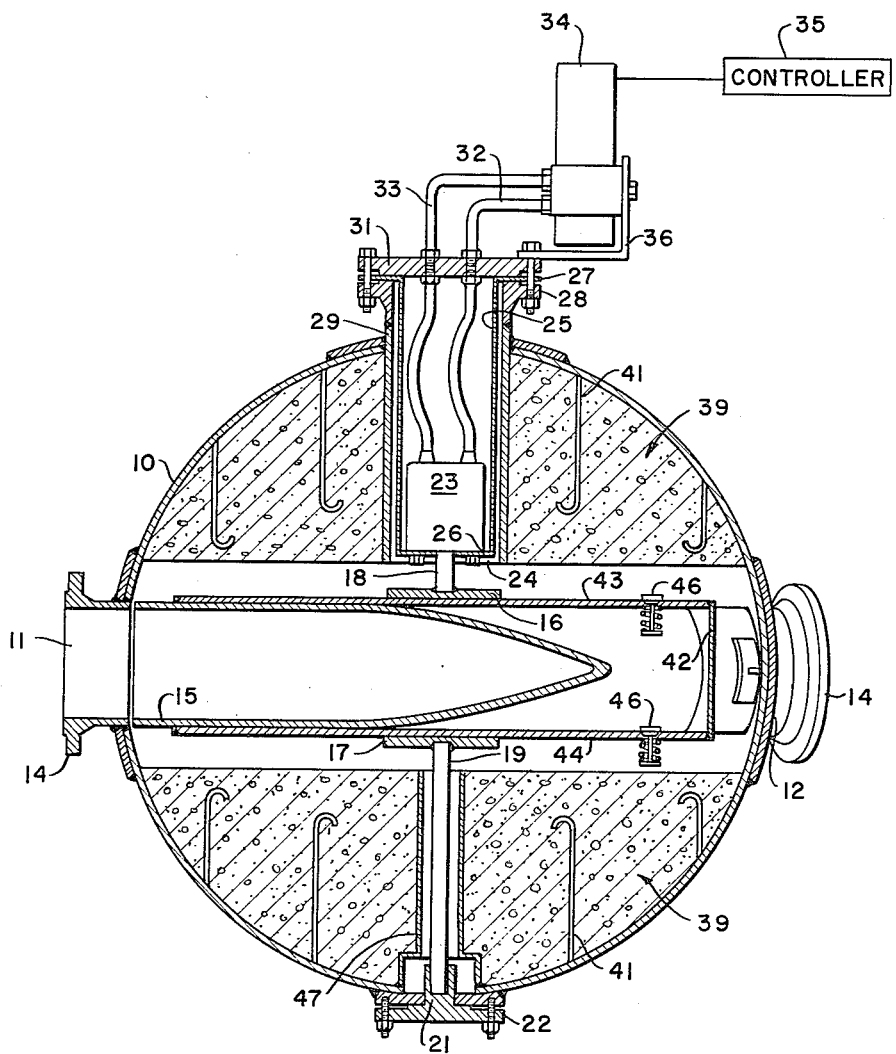

These and other objects of this invention will be understood from the following description taken with reference to the drawing wherein:

FIGURES 1 and 2 are plan and elevation views of the pipe scraper diverter apparatus of the present invention; and FIGURE 3 is a schematic piping diagram showing the pipe scraper diverter apparatus of FIGURES 1 and 2 positioned at a junction point in a pipe line together with controller means for automatically positioning the diverter apparatus.

Referring to FIGURES 1 and 2 of the drawing, the present pipe scraper switching apparatus comprises a housing 10 which is preferably a spherical pressure vessel, which may be fabricated in any suitable manner, having an inlet port 11 and at least a pair of outlet ports 12 and 13. The ports are preferably provided with flanges 14 or other suitable connecting means by which the housing 10 can be connected into a pipe line system.

As shown in FIGURE 2, the inlet port 11 and the outlet ports 12 and 13 in the same plane as the center line of a movable conduit section 15 which is movably mounted within the housing 10. The conduit section 15 is a smoothly bent tubular member having a length substantially equal to the internal diameter of the spherical housing 10. The ends of the conduit section 15 are shaped so as to have the same configuration as the inside of the spherical housing. The radius of bend of the conduit section 15 must be compatible with the type and size of scraper devices to be passed through it.

Fixedly secured to the top and bottom of the conduit section 15 are top and bottom plates 16 and 17, respectively, to which are attached in turn, as by welding, upper and lower shafts 18 and 19, respectively. The bottom of the lower shaft 19 is preferably positioned in a bearing unit or housing 21 which is either fixedly secured to the bottom of the housing or to a flange 22 which may be bolted to the housing 10. The upper shaft 18 is keyed to a motor operator 23 arranged to rotate the conduit section 15 in either direction about the axis of the shafts 18 and 19.

While the motor operator 23 may be readily mounted either outside or inside the housing 10, in the embodiments shown the motor operator 23 is shown as being positioned in a power-operated chamber formed by a tubular housing 25 with a closure plate 26 at its lower end, while being provided at its upper end with a flange 27 adapted to be secured between housing flange 28 and blank flange 31 by means of gaskets. The tubular section 25 extends downwardly through port means 29 in the top of the housing 10.

The top of the port means 29 and the tubular member 25 are closed by a blank flange 31 through which electrical, hydraulic or pneumatic leads or piping 32 and 33 extend to supply power to the motor operator 23. The other end of the power leads or tubing 32 and 33 are connected to a suitable source of power 34 which in turn is operatively connected to controller means 35. If desired, the power source 34 and/or the controller means 35 may be mounted to the top of the housing or flange 31 by means of a bracket 36.

While the motor operator 23 may be arranged in any suitable manner well known to the art to rotate the conduit section 15 from one position to the other shown in FIGURE 1, the interior wall of the housing 10 is preferably provided with a pair of stops 37 and 38 which are rigidly secured so as to limit the movement of the conduit section 15 and perfectly align section 15 with either of the outlet ports 12 and 13. Although no stops need be provided, the motor operator 23 is also adapted to rotate the conduit section 15 less than 90 degrees until it is substantially normal to the center line through the inlet port 11. With the conduit section 15 in this position an incoming fluid may be delivered simultaneously through outlet ports 12 and 13, with the fluid flowing over, under and/or around the conduit section 15.

In order to reduce the amount of fluid within the housing 10, and thereby cut down the amount of contamination that it would cause to a second product being sent through the pipe line, a portion of the interior of the housing may be cut off by suitable plate means or by filling it with a suitable non-reacting filler material 39, such as concrete, gunite, or other hard-setting substance. This substance 39 is placed in the housing 10 during construction and struck smooth sufficiently close to the top and bottom of the conduit section 15 to cut down the volume of the housing while still allowing an adequate area for the flow of fluid across the tubular conduit section, from the inlet port 11 to the outlet ports 12 and 13 when the conduit section 15 is positioned transverse to a center line through the inlet port 11. If desired, suitable anchor rods 41 may be provided to hold the filler material 39 in place. With the dead space cut down to a large extent by use of a filler material 39, the fluid velocity through the housing 10 is maintained sufficiently high to minimize any intermixing of one fluid which may follow another through the housing.

Prior to filling the lower portion of the housing 10 with cement or gunite a tubular protective casing 47 is fixedly secured to the housing 10 in position so as to surround the lower shaft 19.

To reduce further the amount of dead space within the housing 10, a flat cylindrical tank may be formed by a cylindrical wall 42 (FIGURE 1) and top and bottom plates 43 and 44 (FIGURE 2), respectively. The diameter of the cylindrical wall 42 is selected small enough so that the passageway 45 formed between the outer wall of the cylindrical wall 42 and the inner wall of the housing 10 is sufficient in cross-sectional area to permit substantial flow of fluid therethrough. Preferably, the cylindrical tank is provided with pressure relief valves 36 installed in the top and bottom plates 43 and 44. The tank formed by elements 42, 43, and 44 provides a dead space in the vessel around which the flowing fluid stream may pass on its way out of the housing 10 when conduit section 15 is in a position transverse to the centerline through inlet port 11, and in doing so minimizes the intermixing of one fluid which may follow another through the housing 10. The relief valves 46 provide a means of equalizing the pressure inside and outside of the cylindrical tank to prevent rupture which might take place from excessive pressure differential.

A scraper diverter apparatus of the present invention is shown in plan view in FIGURE 3 as being installed at a junction point where the main pipe line 51 splits into two branch pipe lines 52 and 53. All three pipe lines 51, 52, and 53 are shown as being provided with conventional scraper-launching or receiving barrels 54, 55, and 56, respectively, with bypass lines 57, 58, and 59 around the barrels. By means of scraper-launching barrel 54, scrapers, plugs, or spheres, preferably as shown and described in copending application Serial No. 689,804, filed October 14, 1957 now Patent No. 2,965,114 may be inserted into and propelled through the main pipe line 51 with a flowing fluid.

A plurality of these scrapers or spheres are employed to bracket the interfacial volume between two different fluids such as gasoline and fuel oil, being pumped through the pipe line one after the other. In addition to maintaining the two diverse liquids separated, the spheres or solid bodies also serve to indicate the end of one product being delivered and the arrival of the second product. Thus, by employing scraper indicators 61, 62, and 63 in pipe lines 51, 52, and 53, respectively, of the type shown and described in U.S. Patent 2,698,363 issued December 28, 1954 to Rush, the arrival of the first and subsequent solid bodies may be indicated with the signals from the indicators being put into a master controller 35 which may, if desired, be controlled by a remote controller 65.

The housing 10 is also preferably provided with a series of signaling devices 66, 67, and 68 which indicate the position of the conduit section 15 within the housing 10. If desired, valves 70, 71, and 72 may be employed where the remote switching of the fluid stream from carrier line 52 to carrier line 53 or vice versa is required as well as scraper diversion is desired. During operation the conduit section 15 within the housing 10 may be caused to align itself between the diverter inlet 11 and a desired outlet by proper manipulation by operating personnel at the site of the junction, if attended operation is desired. If automatic or unattended operation is desired, as for instance if valves 71 and 72 are to be opened and/or closed by signal means from some remote location, as for example from the terminus of line 53, the remote controller 65 may be employed to cause the conduit section 15 to be aligned between inlet 11 and outlet 12 when valve 71 is open, or alternatively between inlet 11 to outlet 13 if valve 72 is open. In addition, the controller means 65, 35 may be arranged to position the conduit 15 within the housing 10 at some arbitrary mid-point position, say with the conduit in contact with signal device 68, when both valves 71 and 72 are open to receive fluids simultaneously.

If desired, the scraper indicator 61, which may be positioned some distance upstream of the junction point where the housing 10 is located, may serve as an anticipatory scraper indicator signal which may be interlocked through master controller 35 with signaling devices 66, 67, and 68 and with valve 70 so as to form an interlocking safety device to close valve 70 automatically if a scraper or spheroid passes scraper indicator 61 when the conduit 15 within the housing 10 is not properly aligned to permit free passage of the scraper or spheroid into one of the branch lines 52 or 53, whose valve is opened and which is carrying the main carrier line flow. The scraper indicators 62 and 63 are not entirely necessary to the operation but may be employed to signal the proper passage of a scraper or spheroid through the diverter housing 10 or to count the number of scrapers or spheroids which have passed the point. The controller means 35 is provided for reversal of direction of the conduit 15 when subsequently required.

Referring to the drawings, a typical operating procedure for the present remote controlled pipe line scraper diverter would be as follows where it is desired to switch the flow from branch line 52 to branch line 53 when the flow is from main line 51 to branch line 52. In such a situation, motor-operated valves 70 and 71 would be open with switches 67 and 68 open and switch 66 closed and with conduit 15 in line with branch pipe line 52. The operator in charge would energize the master controller 35 through the remote controller 65. Simultaneously the motor-operated valve 72 begins to open. This actuates a switch in the controller 35 and energizes the circuit which actuates motor operator 23 through power source 34 and begins rotating conduit 15. Motor-operated valve 71 now begins to close. At this point both of the valves 71 and 72 are partially open with flow being directed through both by means of the diverter apparatus 10. At the end of the operation, valve 72 is in its full open position while valve 71 is closed with the motor 23 and power 34 having rotated the conduit 15 into alignment with branch line 53. In this state switch 66 is opened and 67 is closed. Any scraper is now able to pass through the diverter housing 10 from main line 51 into the branch pipe line 53.

In order to switch the flow of pipe line 51 from branch line 53 to 52 the operation is simply reversed. Upon energizing the master controller 35, motor-operated valve 71 begins to open and motor operator 23 begins to rotate in the opposite direction. At the end of the operation, valve 71 is opened, valve 72 closed, switch 66 closed, switch 67 opened, and the motor operator 23 has reversed the direction of rotation of conduit 15 and moved it until it is now aligned with conduit 52.

In order to split the fluid stream of pipe line 51 from full line stream to branch line 52, to a split stream going to both branch lines 52 and 53, the operator energizes the master controller in a manner such that valve 72 begins to open while motor operator 23 begins to rotate the conduit 15. The controller 35 has incorporated therein suitable means such that if valve 71 does not begin to close after valve 72 has begun to open, when the conduit 15 actuates switch 68, the motor operator 23 is stopped thereby. When motor-operated valve 71 stays open, the diverter conduit 15 therefore stops in a position so that its axis is susbtantially normal to the axis of the inlet port 11. Valve 72 remains open and switches 66 and 67 both remain open with switch 68 closed.

All scrapers passing through the pipe line strike the scraper indicator signal device 61. If either switch 66 or 67 is closed, the scraper continues and passes through the diverter housing. If neither switch 66 nor 67 is closed or if a time switch has not been actuated, the motor-operated valve 70 closes pipe line 51 automatically until either the conduit 15 comes into position or repairs are made to the apparatus. The controller 35 and the scraper signaling devices 61, 62, and 63 are preferably arranged so that when the scraper passes scraper indicator 61, the diverter conduit 15 cannot be rotated until it has passed either indicating devices 62 or 63. Instead of automatic operation, the present scraper diverter apparatus can be operated manually by energizing the motor 23 at the site of the pipe line junction. Thus if the motor operator 23 is a hydraulic motor, it could be started and operated in the desired direction to rotate conduit 15 by pumping the hydraulic fluid through the proper conduit, 32 or 33.

I claim as my invention:
1. A scraper diverter for use at a pipe line junction, said diverter comprising a housing having a single inlet port and two discharge ports, a conduit rotatably-mounted within said housing and fixedly positioned against axial movement for selectively connecting the inlet port with one of siad outlet ports, said conduit being in the form of a pipe section smoothly curved in an axial direction and adapted to be positioned in full-flow communication between the inlet port and selectively with each of said discharge ports, means for rotating the conduit within said housing, and flow passage means within said housing outside said conduit in open communication between said inlet port and both of said outlet ports when either outlet port is in communication with said conduit.

2. A scraper diverter for use at a pipe line junction, said diverter comprising a housing having a single inlet port and two discharge ports, a conduit smoothly curved in an axial direction and rotatably-mounted within said housing and fixedly positioned against axial movement for selectively connecting the inlet port in full-flow communication with each of said outlet ports, shaft means affixed to said conduit normal to the axis thereof, means operatively-connected to said shaft means for rotating the conduit within said housing, and flow passage means within said housing outside said conduit in open communication between said inlet port and both of said outlet ports when neither outlet port is in communication with said conduit.

3. Apparatus adapted to be connected into a pipe line at a junction point where the line splits into at least two branch lines, said apparatus being arranged to divert selectively into one of said branch lines a solid body having a diameter substantially equal to the inner diameter of the pipe line, said apparatus comprising a diverter housing having a single inlet port adapted to be connected to the pipe line, at least two outlet ports adapted to be connected to said branch lines, said ports being of a diameter equal to the lines to which they are connected, a smoothly-curved conduit of the same diameter rotatably-mounted in said housing and fixedly positioned against axial movement, said conduit being smoothly curved in an axial direction, shaft means secured to said conduit for mounting said conduit for movement to a selected position within said housing, means connected to said shaft means for actuating said conduit to at least one of two positions, the conduit being in full-flow communication in one position between the inlet port and one outlet port and in the other position with the other outlet port, and a fluid passageway outside said conduit within said housing in open communication between said inlet port and all of said outlet ports when the conduit is not in full-flow comunication with one of said outlet ports.

References Cited in the file of this patent
UNITED STATES PATENTS

| | | |
|---|---|---|
| 2,008,248 | Fluck | July 16, 1935 |
| 2,834,376 | Hughes | May 13, 1958 |
| 2,851,648 | Reger | Sept. 9, 1958 |

FOREIGN PATENTS

| | | |
|---|---|---|
| 4,077 | France | Mar. 4, 1905 |